Patented Apr. 9, 1940

2,196,853

UNITED STATES PATENT OFFICE 2,196,853

FLUX COMPOSITION

Lionel Cinamon, New York, and Samuel Sklarew, Yonkers, N. Y., assignors to Special Chemicals Corp., New York, N. Y., a corporation of New York No Drawing. Application October 27, 1938, Serial No. 237,274

7 Claims. (Cl. 148—26)

Our invention relates to fluxes, and more particularly, to a novel and highly improved flux composition for hard soldering, brazing or welding copper, brass or allied metals.

This application is a continuation-in-part of our co-pending application Serial No. 118,397, filed December 30, 1936, for a Flux composition.

In flux compositions heretofore employed, it was found that when used on such metals as copper and brass, there resulted a discoloration of the metals, thus rendering the surfaces to be joined unsightly and undesirable.

It is therefore one of the objects of our invention to provide a flux composition which may be satisfactorily used for hard soldering, brazing or welding metals, such as copper and brass, and which is free from the above described disadvantages.

Another object of our invention is to provide an improved flux composition including an alkali acid fluoride which is particularly suitable for use in hard soldering, brazing or welding copper, brass or allied metals and which will have a minimum toxic effect on workers.

Still another object of our invention is to provide a novel flux composition of the character described which will give consistently satisfactory results and which may be produced in a simple and inexpensive manner.

Other objects of our invention will in part be obvious and in part hereinafter pointed out.

In accordance with our invention a flux composition may be prepared by mixing together boric acid, an alkali acid fluoride, an alkali borate and sufficient water to form a paste. It is desirable that the ingredients be thoroughly mixed in order to form a homogeneous and consistent composition. In this flux composition we have found that when from about 1½% to 10% of an alkali acid fluoride and from about 3% to 37% of an alkali borate are employed the resulting flux composition will give satisfactory results. The amount of alkali acid fluoride used should always be less than the amount of alkali borate.

The following are specific examples of ingredients which may be employed to make satisfactory flux compositions, it being understood that these examples are in no way limitative:

Example I

| | Parts |
|---|---|
| Boric acid | 40 |
| Potassium borate | 40 |
| Potassium acid fluoride | 5 |
| Water | 25 |

Example II

| | |
|---|---|
| Boric acid | 75 |
| Sodium borate | 5 |
| Sodium acid fluoride | 2 |
| Water | 18 |

In the foregoing examples, water is employed to give what is known as a wet flux. The amount of water may be varied to alter the consistency of the flux composition or may be omitted entirely to give a dry flux.

The flux composition made in accordance with our invention has been found to have the following advantages. It has only a comparatively slight toxic effect upon workers. It will not darken or discolor brass, bronze or allied metals nor will it attack or pit such metals or any of the solders or brazing or welding compositions which may be used, even if the excess flux is left on the completed joint. However, this excess flux may be easily removed. It has a low melting point. It readily cleanses metals such as copper and brass and preserves the brightened surfaces in condition for hard soldering, brazing or welding.

It will thus be seen that there is provided a flux composition by means of which the several objects of this invention are achieved, and which are well adapted to meet the conditions of practical use.

As various possible embodiments might be made of the above invention, and as various changes might be made in the embodiments above set forth, it is to be understood that all matter herein set forth is to be interpreted as illustrative and not in a limiting sense.

Having thus described our invention, we claim as new and desire to secure by Letters Patent:

1. A flux composition consisting of boric acid, an alkali acid fluoride and an alkali borate, the boric acid being the predominant component of the composition, the quantity of the alkali borate being greater than the quantity of the alkali acid fluoride.

2. A flux composition consisting of boric acid, water, from about 1½% to 10% of an alkali acid fluoride and from about 3% to 37% of an alkali borate, the quantity of the alkali borate being greater than the quantity of the alkali acid fluoride, the boric acid being the predominant component of the composition.

3. A flux composition consisting of boric acid, water, an alkali acid fluoride and an alkali borate, the boric acid being the predominant component of the composition, the combined quantities of said alkali acid fluoride and said alkali borate being always less than 50% of said composition, the quantity of said alkali acid fluoride being less than the quantity of said alkali borate.

4. A flux composition consisting of boric acid, an alkali acid fluoride and an alkali borate, the amount of said alkali borate varying from about 3% to 37% of said composition, the quantity of said boric acid being never less than the quantity of said alkali borate, the quantity of the alkali borate being greater than the quantity of the alkali acid fluoride, the boric acid being the predominant component of the composition.

5. A flux composition consisting of boric acid, an alkali acid fluoride and an alkali borate characterized by the absence of discoloration when used on copper, brass and like metals, the quantity of said alkali acid fluoride ranging from about 1½ to 10%, the quantity of the alkali borate being greater than the quantity of the alkali acid fluoride, the boric acid being the predominant component of the composition.

6. A flux composition consisting of boric acid, an alkali acid fluoride and an alkali borate in which the quantity of boric acid is never less than the quantity of any of the ingredients of said flux, the quantity of said alkali borate being greater than the quantity of said alkali acid fluoride, the boric acid being the predominant component of the composition.

7. A flux composition consisting of boric acid, an alkali acid fluoride and an alkali borate, the boric acid being the predominant component of the composition, the quantity of said alkali acid fluoride ranging from 1½% to 10%, the quantity of said alkali borate ranging from 2 to 8 times the quantity of said alkali acid fluoride.

LIONEL CINAMON.
SAMUEL SKLAREW.